Feb. 20, 1940.   H. W. ZIMMERMAN   2,190,966
TORQUE MEASURING WRENCH
Filed March 6, 1937
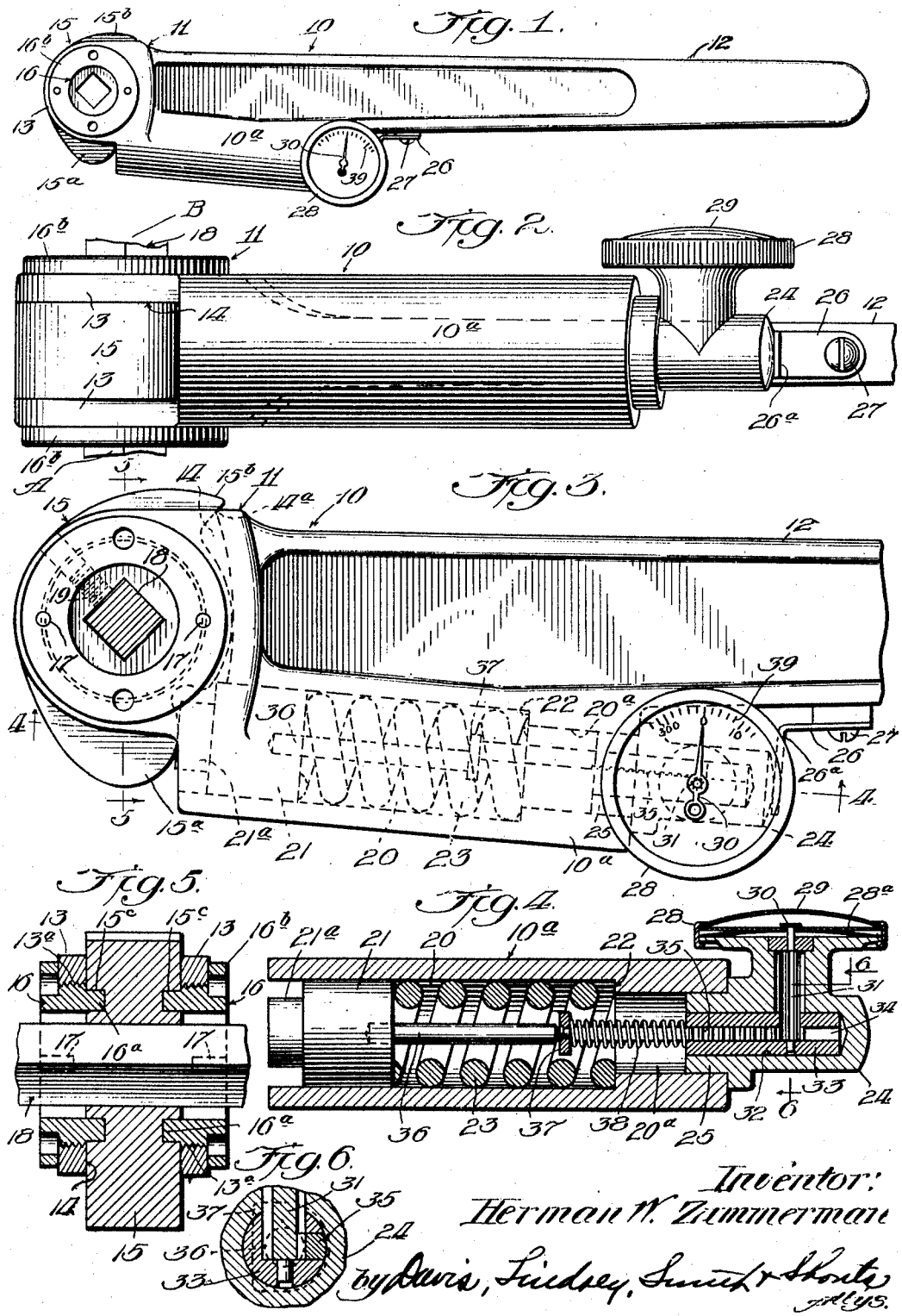
Inventor:
Herman W. Zimmerman
by Davis, Lindsey, Smith & Shonts
Attys.

Patented Feb. 20, 1940

2,190,966

UNITED STATES PATENT OFFICE 2,190,966

TORQUE MEASURING WRENCH

Herman W. Zimmerman, Highland Park, Ill., assignor, by mesne assignments, to Automotive Maintenance Machinery Co., North Chicago, Ill., a corporation of Illinois Application March 6, 1937, Serial No. 129,358

10 Claims. (Cl. 265—1)

My invention relates to wrenches and it has to do more particularly with wrenches adapted for measuring the force or torque applied therethrough in moving the work, which may take the form of nuts, bolts, studs and other rotatably movable devices.

One of the objects of my invention is to provide an improved wrench of the foregoing character which is of simple and sturdy construction, is inexpensive to manufacture, is accurate in its recording function, and which serves its intended purpose at all times in a highly efficient manner.

Another object is to provide a dual wrench structure having provision for indicating the torque applied therethrough and which is also constructed and arranged to be used with the torque indicating feature inactive.

A further object is to provide an invertible torque measuring wrench having indicating means which is adjustable to various positions to facilitate inspection thereof by the operator in either the upright or inverted position of the wrench, and also when the operator assumes various positions while using the wrench.

Additional objects are to provide a compact wrench structure embodying the foregoing features; to provide a structure that may be easily and quickly assembled and disassembled; and to provide an invertible wrench structure embodying the foregoing features and in the use of which the torque measuring feature may be employed to both tighten and loosen nuts, bolts, etc., or the wrench may be used in such a way that this feature is inactive in both tightening and loosening operations.

Other objects and advantages will become apparent as this description progresses, and by reference to the drawing, wherein:

Figure 1 is a top plan view of one form of structure embodying my invention;

Fig. 2 is an enlarged side elevational view of the forward portion of the wrench structure shown in Fig. 1;

Fig. 3 is a top plan view of the particular structure shown in Fig. 2, with certain structural parts shown in dotted lines to more clearly illustrate the relation of the structural parts;

Fig. 4 is a section taken substantially on line 4—4 of Fig. 3;

Fig. 5 is a section taken substantially on line 5—5 of Fig. 3; and

Fig. 6 is an enlarged section taken substantially on line 6—6 of Fig. 4.

The structure shown in the drawing includes a wrench body 10 having a head portion 11 at its forward end and an integral and rearwardly extending handle portion 12. The head portion 11 includes a pair of spaced-apart, shelf-like portions 13 providing therebetween a rock space 14 adapted to receive a rock member 15.

The rock member 15 is part-circular in shape and is provided at its opposite sides with armlike elements 15$^a$ and 15$^b$, the purposes of which will be referred to more particularly hereinafter. This rock member is rotatably supported in the rock space with its arm elements 15$^a$, 15$^b$ projecting laterally from the ends of such space (Fig. 3). Specifically, the means rockably supporting the member 15 includes threaded axial openings 13$^a$ formed in the shelf-like head portions 13 which receive threaded bushings 16 having annular tongue-like extensions 16$^a$ which extend into annular aligned grooves 15$^c$ formed in the opposite faces of the rock member 15. The bushings 16 are provided with heads 16$^b$ which seat upon the outer faces of the shelf-like portions 13, thereby limiting the extent to which the bushings may be screwed in so as to prevent any cramping or distortion of the parts which might interfere with free rock movement of the member 15. When the bushings 16 are screwed into place (Figs. 3 and 5), pins 17 may be inserted through suitable aligned openings formed in the shelf-like portions 13 and the opposite faces of the member 15, whereby such parts are fixedly locked in their desired positions. The rock member 15 is provided with an axial opening in which is received work-engaging means which takes the form of a shaft-like adapter member 18. The adapter member 18 may be held against rotation in any desired manner, as by giving it the shape illustrated. The adapter member 18 may be detachably secured in the member 15 by a set screw 19 applied in the manner illustrated in Fig. 3, and such adapter is of sufficient length that its opposite ends extend outwardly beyond the bushings 16 sufficiently to receive any suitable part or adapter element (not shown) for operatively engaging the same, at either end, with the work. Such additional adapter element may take any desired form suitable for engaging the particular kind of work to which the wrench is applied.

The rock member 15 is positively limited in its clockwise rocking movement, as viewed in Figs. 1 and 3, by the forward face of its arm element 15$^b$ striking a rigid shoulder surface 14$^a$ formed at the adjacent end of the rock space 14. Rock movement of the member 15 in the opposite direction is yieldably opposed by coil spring means which will now be described.

The wrench body 10 is provided with a casing-like portion 10ª having an elongated spring chamber 20, the axis of which extends, normally, at substantially right angles to the adjacent face of the arm 15ª of the member 15. This spring chamber opens forwardly into the adjacent end portion of the rock space 14 and it snugly and slidably receives, at its forward end, a plunger 21 having a forwardly extending reduced stem portion 21ª projecting from the spring chamber into engagement with the adjacent face of the rock member arm 15ª, which is rounded, as best shown in Fig. 3, to minimize friction between the engaged parts in the rocking movement of the member 15. The inner end 20ª of the chamber 20 is reduced, providing a shoulder 22, and a coil spring 23 is disposed in the chamber 20 between the shoulder 22 and the inner face of the plunger 21. The spring 23 is so constructed and arranged that it normally holds the plunger 21 in the position shown in Fig. 3 with the arm 15ᵇ of the rock member 15 seated against the shoulder 14ª. In the use of the structure so far described, and assuming that the wrench is applied to the work in the position shown in Fig. 2 for the purpose of tightening the same, the end A of the adapter shaft is provided with suitable means (not shown) operatively coupling the wrench to the work. As the wrench is moved in clockwise direction to tighten the work, and as soon as the work offers sufficient resistance to this movement to overcome the initial tension of the spring 23, such spring will be compressed by the resultant relative rocking movement between the wrench body and the rock member 15, wherein the member 15 is rocked toward the spring. In this case the torque measuring feature is active in tightening the work. If it is desired to loosen the work (nut, bolt, stud or the like), the wrench may be applied in this same manner and moved in a counterclockwise direction (as viewed in Fig. 3). In this operation, the shoulder 14ª is engaged with the rock member arm 15ᵇ so that the wrench structure functions as a rigid device, the same as if the member 15 were a rigid part of the body 10 and the torque measuring feature is inactive. It will be obvious that by inverting the wrench from the position shown in Fig. 2 and engaging the end B of its adapter shaft with the work, and by moving the wrench in a counterclockwise direction, the force then applied to the wrench will be applied through the spring 23 as first above mentioned and the torque measuring feature is active in loosening the work; and, similarly, by moving the inverted wrench structure in a clockwise direction, the torque measuring feature is inactive and the work is tightened through the rigidly engaged shoulder 14ª and arm 15ᵇ the same as if a rigid wrench structure were being employed.

By using a spring 23 of proper size and power, and by giving it a predetermined rating, one may, by measuring the extent of compression of such spring, or the extent of relative rock movement of the member 15, determine through the aid of indicating means the amount of force or torque applied to the wrench in either tightening or loosening the work, dependent upon whether the wrench is in upright (Fig. 3) or inverted position. I employ suitable indicating mechanism for this purpose, which is adjustably mounted for convenient observation by the operator.

Specifically, the indicating means that I employ includes a casing 24 with a reduced cylindrical hub portion 25 rotatably and snugly received in the rear end of the reduced spring chamber portion 20ª. The indicator casing is held in operative rotative relation with the end of the spring chamber by a leaf spring 26 secured to the handle 12 by a screw 27, which spring is provided with an outwardly projecting flexible leg 26ª engaging the adjacent end of the casing 24. The leaf spring 26 is of such construction and so placed that its leg 26ª yieldably presses the gauge casing 24 forwardly, so that the latter rotates in the spring chamber under tension, and it will remain yieldably in any rotative position to which it may be moved. The indicator casing 24 further rotatably supports a ring-like part 28 to which is secured a dial 28ª protected by a transparent cover member 29. A pointer 30 is mounted above the dial 28 and is rotatably supported by an elongated pinion member 31 rotatably supported in the manner indicated in Figs. 4 and 6. The indicator casing is further provided with an opening 32 which receives a bushing 33 provided, in turn, with an opening 34 adapted to slidably support a rack 35 extending toward and into the spring chamber 20 in offset relation with respect to the pinion 31 so that its teeth may effect proper engagement with the teeth of the pinion. The inner end of the plunger 21 fixedly supports a rearwardly extending pin 36, the free end of which seats against a laterally offset portion of a plate-like element 37 fixedly carried by the forward end of the rack 35 which projects into the spring chamber 20. Since the pin 36 and plate 37 are not interconnected, I employ a spring 38 surrounding that portion of the rack 35 that projects into the spring chamber, which spring is confined between the plate element 37 and the forward end of the bushing 33. This spring 38 is so arranged that the rack 35 is caused to follow the pin 36 and plunger 21 in the outward movement of the latter as the rock member 15 moves away from the spring 23.

The foregoing indicating mechanism is so arranged that, when the torque indicating feature of the wrench is employed in tightening or loosening a nut and the plunger 21 is moved inwardly against the spring 23, the pointer 30 of the indicator will be caused to move in clockwise direction relative to the scale 39 thereon. The connections driving the pointer 30 are of such construction that a very slight movement of the rock member 15 and plunger 21 results in a substantially larger movement of the pointer 30. The graduations of the scale 39 are such that they preferably register the extent of compression of the spring 23, movement of the plunger 21 and rock movement of the member 15 in terms of inch-pounds pressure. That is to say, it may be determined that any particular compression of the spring will require certain inch-pounds pressure, and the graduations on scale 39 may be arranged to accurately indicate to the operator the extent of compression of the spring or the particular inch-pounds pressure applied. Also, to facilitate use of this structure, the dial carrying member 28 may be rotated relative to the casing 24 to move the dial 28ª so that its zero mark is always initially in registration with the pointer or hand 30.

It will be seen from the foregoing that a wrench embodying my invention is not only quite simple in construction, but it is compact and is of sufficient sturdiness to readily withstand the customary usage of devices of this kind in garages, service stations, and the like. The wrench may be used to measure torque, or it may be used as an ordinary wrench without this feature, either in tightening or loosening nuts, bolts, studs, or the like. In the use of a wrench of this kind, bolts, nuts, studs, etc., located in various positions may be worked upon. The operator may have to assume various positions with respect to the position of the wrench. The rotatable mounting of the dial casing provides for movement of the indicator dial to various positions to accommodate the position of the operator so that he can readily determine the pressure applied. This adjustable indicator feature also facilitates the inversion feature of the wrench, the indicator mechanism being rotatable to an inverted position so that it can be observed in inverted position of the wrench. A wrench of this character, while adaptable to various uses, fills a particular need in the automotive service field. It insures the setting up of nuts, bolts, studs, etc., to a predetermined extent, thereby avoiding breakage thereof; and it insures the setting up of a series of nuts, bolts or studs to the same extent where that condition is required. One example of this is the cylinder head of an automotive engine, where the cylinder head studs should be set up or tightened in a uniform manner to avoid distortion, which, if it exists, has been found to cause lowered engine efficiency. In these respects the instrument is substantially foolproof and may be readily used by unskilled as well as skilled operators. So far as the torque measuring feature of the wrench is concerned, it may well be employed to determine the amount of force required to rotate a crank shaft or a lathe spindle or other rotatable part in its bearing; and in this way one may determine with accuracy the fit of such part in its bearing. To this end, it is only necessary to provide a suitable work adapter element (not shown) for attachment to the adapter member 18.

It will be understood that, while I have shown only one form of structure embodying my invention, changes in details and arrangement of parts may be resorted to without departing from the spirit and scope of my invention, as defined by the claims that follow.

I claim:

1. In structure of the class described, a body, a handle thereon, a rock member mounted on said body and having oppositely extending arm elements thereon, means coaxial with the rock axis of said rock member for operatively engaging said rock member with the work, said body having an integral and rigid stop portion thereon engaged by one of said arm elements to positively limit rock movement of said rock member in one direction, compressible spring means carried by said body and operatively connected with the other or said arm elements so that it yieldably holds said one arm element engaged with said stop portion and yieldingly opposes rock movement of said rock member away from said body stop portion, and means for registering the amount of force or torque applied through the wrench to the work including an indicator device operatively connected with said rock member and indicating the extent of rock movement of said rock member and deflection of said spring means, said registering means being inactive when said rock member tends to rock from a normal position toward said stop portion.

2. In structure of the class described, a body, a handle thereon, a rock member mounted on said body and having oppositely extending arm elements thereon, said body having a stop portion thereon adapted to be engaged by one of said arm elements to positively limit rock movement of said rock member in one direction, said body having a spring chamber formed therein with its axis extending at substantially right angles to the other of said arm elements, a compression spring in said chamber, a plunger in said chamber constantly urged forwardly by said spring, said plunger having a portion projecting into engagement with the latter of said arm elements so that the first-mentioned arm element of said rock member is normally and yieldably held seated against said body stop portion, work-engaging means carried by said rock member, and a force or torque indicating device carried by said body and having a movable indicator and a connection independent of said arm elements between said indicator and said plunger for transmitting movement of the latter directly to the former.

3. A torque measuring wrench comprising a body, a member thereon and movable relative thereto and adapted for operative connection with the work, compressible means opposing relative movement of said member and body, and means for measuring the amount of force or torque applied through the wrench as determined by the extent of relative movement between said member and body, including an indicator unit adjustably mounted upon said body and having a movable indicator element, connections between said element and member, and means yieldably holding said unit in any position to which it may be adjusted relative to said body.

4. A torque measuring wrench comprising a body, a member thereon and movable relative thereto and adapted for operative connection with the work, compressible means opposing relative movement of said member and body, and means for measuring the amount of force or torque applied through the wrench as determined by the extent of relative movement between said member and body including an indicator unit having a casing member rotatably mounted in said body, and yieldable means holding said casing in any rotative position to which it may be moved.

5. A torque measuring wrench comprising a body, a member thereon and movable relative thereto and adapted for operative connection with the work, compressible means opposing relative movement of said member and body, and means for measuring the amount of force or torque applied through the wrench as determined by the extent of relative movement between said member and body including an indicator unit having a casing with a part rotatably mounted in said body on an axis extending longitudinally of and along one side of the latter, and an indicating element carried by said casing and exposed to view, the arrangement being such that said casing may be rotated so that said indicating element may be observed in either an upright or inverted position of the wrench and when the user of the wrench assumes various positions relative thereto.

6. A torque measuring wrench comprising a body, a member thereon and movable relative thereto and adapted for operative connection with the work, compressible means, a second member connecting said first member with said compressible means so that it opposes relative movement of said first member and body, and means for measuring the amount of force or torque applied through the wrench as determined by the extent of relative movement between said first member and body, including a casing member having a part rotatably mounted in said body on an axis extending in the direction of compression of said compressible means whereby said casing may be moved from an upright to an inverted position, and vice versa, movable indicating means visibly carried by said casing, connections between said second member and said indicating means including a rack carried by said casing and extending along the axis of said part thereof and an element on said second member abutting said rack, said connections being so constructed and arranged that rotation of said casing does not affect the ability of said connections to transmit motion of said movable member to said visible indicating means.

7. A torque measuring wrench comprising a body, a member thereon and movable relative thereto and adapted for operative connection with the work, compressible means opposing relative movement of said member and body, means for measuring the amount of force or torque applied through the wrench as determined by the extent of relative movement between said member and body, including a casing member having a part rotatably mounted in said body on an axis extending in the direction of compression of said compressible means, movable indicating means visibly carried by said casing, connections between said movable member and said indicating means including a rack carried by said casing and extending along the axis of said part thereof, said connections being so constructed and arranged that rotation of said casing does not affect the ability of said connections to transmit motion of said movable member to said visible indicating means, and tension means carried by said body and engaging said casing member for yieldably holding it in any of its rotative positions.

8. A torque measuring wrench comprising a body, a rock member thereon and having an arm element, said body having a spring chamber therein with its axis aligned with said arm element, a compressible spring in said chamber, a plunger in said chamber urged forwardly by said spring and having a part engaging said arm element, work-engaging means carried by said rock member, and means for registering the force or torque applied through the wrench to the work including a casing member rotatably mounted in said body on an axis aligned with said spring chamber, a movable indicator element carried by said casing, means including a rack carried by said casing and movable longitudinally thereof for rotating said indicator element, and a motion transmitting element between said plunger and said rack, whereby movement of said plunger as controlled by said rock member and spring is transmitted to said movable indicating element.

9. In structure of the class described, a body member, a handle member projecting therefrom, a rock member on said body and having arms projecting oppositely therefrom, said body having a part against which one of said arms is adapted to seat, resilient means carried by said body and operatively engaged with the other of said arms yieldably holding said one arm engaged with said body part and also yieldingly opposing rock movement of said rock member in a direction toward said resilient means and away from said body part, work-engaging means carried by said rock member and having its axis longitudinally aligned with the axis of said rock member, and indicator means operatively associated with said rock member and indicating the force or pressure applied through the wrench as determined by the extent of compression of said resilient means and the extent of rock movement of said rock member relative to said body.

10. A torque measuring wrench which comprises a body, a rock member thereon, stop means on said body which is engaged by said rock member in the normal at-rest position of said rock member so that when said body is rotated relative to said rock member in one direction they rotate together as a rigid unit and when it is rotated in the opposite direction it is moved relatively to said rock member, the arrangement being such that said stop means prevents relative movement of said body in only one direction and from only one position of the latter, resilient means carried by said body and engaging said rock member for yieldably holding the latter against said stop means and for yieldably opposing relative movement of said rock member away from said stop means, work-engaging means carried by said rock member coaxial with the rock axis thereof, said work-engaging means having projections on the opposite sides of said rock member so that the work may be engaged in either an upright or inverted condition of the wrench, and indicating means for registering the extent of relative rock movement between said body and rock member for indicating the force or torque applied through the wrench to the work.

HERMAN W. ZIMMERMAN.